United States Patent
Sheehan

(10) Patent No.: US 12,097,654 B1
(45) Date of Patent: *Sep. 24, 2024

(54) DEFLECTING MEMBER FOR MAKING FIBROUS STRUCTURES

(71) Applicant: The Procter & Gamble Company, Cincinnati, OH (US)

(72) Inventor: Jeffrey Glen Sheehan, Symmes Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/347,666

(22) Filed: Jul. 6, 2023

Related U.S. Application Data

(63) Continuation of application No. 17/847,286, filed on Jun. 23, 2022, now Pat. No. 11,732,413, and a
(Continued)

(51) Int. Cl.
| | |
|---|---|
| *B29C 64/10* | (2017.01) |
| *B29C 64/176* | (2017.01) |
| *B29C 64/209* | (2017.01) |
| *B29C 64/245* | (2017.01) |
| *B33Y 10/00* | (2015.01) |
| *B33Y 30/00* | (2015.01) |
| *B33Y 40/20* | (2020.01) |
| *B29K 105/00* | (2006.01) |

(52) U.S. Cl.
CPC ............ *B29C 64/10* (2017.08); *B29C 64/176* (2017.08); *B29C 64/209* (2017.08); *B29C 64/245* (2017.08); *B33Y 10/00* (2014.12); *B33Y 30/00* (2014.12); *B33Y 40/20* (2020.01); *B29K 2105/0094* (2013.01)

(58) Field of Classification Search
CPC ... B29C 64/112; B29C 64/106; B29C 64/291; B33Y 10/00; B33Y 30/00
See application file for complete search history.

(56) References Cited

U.S. PATENT DOCUMENTS

| | | | |
|---|---|---|---|
| 3,034,180 A | 5/1962 | Greiner et al. | |
| 3,322,617 A | 5/1967 | Osborne | |

(Continued)

FOREIGN PATENT DOCUMENTS

| | | |
|---|---|---|
| DE | 3017089 A1 | 11/1981 |
| EP | 0223614 A2 | 5/1987 |

(Continued)

OTHER PUBLICATIONS

"UV-curing Behaviors and Mechanical Properties of UV-cured Polylactic Acid (PLA)", Seung-Woo, Lee et. al., Journal of the Korean Wood and Science Technology, vol. 41, Issue 2, pp. 134-140, (Year: 2013).

(Continued)

*Primary Examiner* — Emmanuel S Luk
*Assistant Examiner* — Debjani Roy
(74) *Attorney, Agent, or Firm* — Richard L. Alexander; Andrew J. Mueller

(57) ABSTRACT

A method of making deflection members is disclosed. The deflection members may be 3D objects that may include cross-linkable polymers and may be printed directly onto permeable materials utilizing at least two different printer settings.

9 Claims, 12 Drawing Sheets

Related U.S. Application Data continuation of application No. 15/796,067, filed on Oct. 27, 2017, now Pat. No. 11,396,725.

(56) References Cited

U.S. PATENT DOCUMENTS

| | | |
|---|---|---|
| 3,414,459 A | 12/1968 | Ronald |
| 3,547,723 A | 12/1970 | Gresham |
| 3,859,735 A | 1/1975 | Katterjohn, Jr. |
| 4,211,743 A | 7/1980 | Kos et al. |
| 4,528,239 A | 7/1985 | Trokhan |
| 4,537,658 A | 8/1985 | Albert |
| 4,828,563 A | 5/1989 | Mueller-lierheim |
| 4,842,905 A | 6/1989 | Stech |
| 5,104,592 A | 4/1992 | Hull et al. |
| 5,527,428 A | 6/1996 | Trokhan et al. |
| 5,658,334 A | 8/1997 | Caldarise et al. |
| 5,714,041 A | 2/1998 | Ayers et al. |
| 5,893,965 A | 4/1999 | Trokhan et al. |
| 5,900,122 A | 5/1999 | Huston |
| 5,948,210 A | 9/1999 | Huston |
| 6,074,525 A | 6/2000 | Richards |
| 6,126,784 A | 10/2000 | Ficke et al. |
| 6,171,447 B1 | 1/2001 | Trokhan |
| 6,402,895 B1 | 6/2002 | Best |
| 6,420,100 B1 | 7/2002 | Trokhan et al. |
| 6,514,382 B1 | 2/2003 | Kakiuchi et al. |
| 6,576,090 B1 | 6/2003 | Trokhan et al. |
| 6,576,091 B1 | 6/2003 | Cabell et al. |
| 6,660,129 B1 | 12/2003 | Cabell et al. |
| 6,660,362 B1 | 12/2003 | Lin et al. |
| 6,878,238 B2 | 4/2005 | Bakken et al. |
| 7,005,043 B2 | 2/2006 | Toney et al. |
| 7,005,044 B2 | 2/2006 | Kramer et al. |
| 7,014,735 B2 | 3/2006 | Kramer et al. |
| 7,105,465 B2 | 9/2006 | Patel et al. |
| 7,118,647 B2 | 10/2006 | Cabell et al. |
| 7,166,196 B1 | 1/2007 | Kramer et al. |
| 7,198,743 B2 | 4/2007 | Tuma |
| 7,384,588 B2 | 6/2008 | Gordon et al. |
| 7,799,382 B2 | 9/2010 | Payne et al. |
| 8,216,427 B2 | 7/2012 | Klerelid et al. |
| 8,454,800 B2 | 6/2013 | Mourad et al. |
| 8,470,133 B2 | 6/2013 | Cunnane et al. |
| 8,758,569 B2 | 6/2014 | Aberg et al. |
| 8,801,903 B2 | 8/2014 | Mourad et al. |
| 8,815,057 B2 | 8/2014 | Eberhardt et al. |
| 8,822,009 B2 | 9/2014 | Riviere |
| 9,005,710 B2 | 4/2015 | Jones et al. |
| 9,011,644 B1 | 4/2015 | Werth et al. |
| 9,926,667 B2 | 3/2018 | Manifold et al. |
| 9,938,666 B2 | 4/2018 | Manifold et al. |
| 9,976,261 B2 | 5/2018 | Manifold et al. |
| 10,214,856 B2 | 2/2019 | Manifold et al. |
| 10,233,593 B2 | 3/2019 | Manifold et al. |
| 10,240,298 B2 | 3/2019 | Manifold et al. |
| 10,385,509 B2 | 8/2019 | Manifold et al. |
| 10,465,340 B2 | 11/2019 | Manifold et al. |
| 10,577,722 B2 | 3/2020 | Ashraf et al. |
| 10,676,865 B2 | 6/2020 | Brent, Jr. et al. |
| 10,683,614 B2 | 6/2020 | Brent, Jr. et al. |
| 10,794,004 B2 | 10/2020 | Manifold et al. |
| 10,815,618 B2 | 10/2020 | Brent, Jr. et al. |
| 10,844,539 B2 | 11/2020 | Brent, Jr. et al. |
| 10,865,521 B2 | 12/2020 | Brent, Jr. et al. |
| 10,900,170 B2 | 1/2021 | Manifold et al. |
| 10,900,171 B2 | 1/2021 | Manifold et al. |
| 10,927,500 B2 | 2/2021 | Manifold et al. |
| 10,933,577 B2 | 3/2021 | Manifold et al. |
| 11,396,725 B2 * | 7/2022 | Sheehan ............... D21F 11/006 |
| 11,486,092 B2 | 11/2022 | Brent, Jr. et al. |
| 11,585,045 B2 | 2/2023 | Brent, Jr. et al. |
| 11,732,413 B2 | 8/2023 | Sheehan |
| 2004/0065421 A1 | 4/2004 | Cabell et al. |
| 2004/0109972 A1 | 6/2004 | Baker |
| 2004/0126710 A1 | 7/2004 | Hill et al. |
| 2004/0154763 A1 | 8/2004 | Polat et al. |
| 2005/0123726 A1 | 6/2005 | Broering et al. |
| 2005/0280184 A1 | 12/2005 | Sayers et al. |
| 2006/0019567 A1 | 1/2006 | Sayers |
| 2006/0061016 A1 | 3/2006 | Gordon et al. |
| 2006/0127641 A1 | 6/2006 | Barnholtz et al. |
| 2006/0278298 A1 | 12/2006 | Ampulski et al. |
| 2007/0029062 A1 | 2/2007 | Hikita |
| 2007/0116928 A1 | 5/2007 | Monnerie et al. |
| 2007/0137814 A1 | 6/2007 | Gao |
| 2007/0170610 A1 | 7/2007 | Payne et al. |
| 2008/0199655 A1 | 8/2008 | Monnerie et al. |
| 2008/0245498 A1 | 10/2008 | Ostendorf et al. |
| 2010/0119779 A1 | 5/2010 | Ostendorf et al. |
| 2011/0265967 A1 | 11/2011 | Phan et al. |
| 2011/0311345 A1 | 12/2011 | Mcneil |
| 2012/0043036 A1 | 2/2012 | Polat et al. |
| 2013/0287933 A1 | 10/2013 | Kaiser et al. |
| 2013/0319625 A1 | 12/2013 | Mohammadi et al. |
| 2014/0004307 A1 | 1/2014 | Sheehan |
| 2014/0272269 A1 | 9/2014 | Hansen |
| 2015/0102526 A1 | 4/2015 | Ward et al. |
| 2016/0053436 A1 | 2/2016 | Morton et al. |
| 2016/0060811 A1 | 3/2016 | Riding et al. |
| 2016/0090692 A1 | 3/2016 | Eagles et al. |
| 2016/0090693 A1 | 3/2016 | Eagles et al. |
| 2016/0159007 A1 | 6/2016 | Miller, IV et al. |
| 2016/0185041 A1 | 6/2016 | Lisagor et al. |
| 2016/0185050 A1 | 6/2016 | Topolkaraev et al. |
| 2016/0244628 A1 | 8/2016 | Breton et al. |
| 2017/0275822 A1 | 9/2017 | Manifold et al. |
| 2018/0209096 A1 | 7/2018 | Burazin et al. |
| 2019/0003079 A1 | 1/2019 | Ashraf |
| 2019/0038080 A1 | 2/2019 | Bui Tran et al. |
| 2019/0127913 A1 * | 5/2019 | Sheehan ............... B33Y 70/00 |
| 2019/0330794 A1 | 10/2019 | Dao et al. |
| 2020/0149191 A1 | 5/2020 | Ashraf et al. |
| 2021/0102338 A1 | 4/2021 | Manifold et al. |
| 2021/0108368 A1 | 4/2021 | Manifold et al. |
| 2023/0086146 A1 | 3/2023 | Brent, Jr. et al. |
| 2023/0151544 A1 | 5/2023 | Brent, Jr. et al. |

FOREIGN PATENT DOCUMENTS

| | | |
|---|---|---|
| EP | 2123826 A2 | 11/2009 |
| WO | 03082550 A2 | 10/2003 |
| WO | 2004045834 A1 | 6/2004 |
| WO | 2009067079 A1 | 5/2009 |
| WO | 2015000755 A1 | 1/2015 |
| WO | 2016085704 A1 | 6/2016 |

OTHER PUBLICATIONS

All Office Actions; U.S. Appl. No. 15/794,025, filed on Oct. 26, 2017.

All Office Actions; U.S. Appl. No. 15/794,026, filed on Oct. 26, 2017.

All Office Actions; U.S. Appl. No. 15/794,027, filed on Oct. 26, 2017.

All Office Actions; U.S. Appl. No. 15/795,329, filed on Oct. 27, 2017.

All Office Actions; U.S. Appl. No. 15/795,339, filed on Oct. 27, 2017.

All Office Actions; U.S. Appl. No. 15/796,067, filed on Oct. 27, 2017.

All Office Actions; U.S. Appl. No. 16/866,914, filed on May 5, 2020.

All Office Actions; U.S. Appl. No. 17/092,670, filed on Nov. 9, 2020.

All Office Actions; U.S. Appl. No. 17/847,286, filed on Jun. 23, 2022.

All Office Actions; U.S. Appl. No. 17/936,425, filed on Sep. 29, 2022.

All Office Actions; U.S. Appl. No. 18/157,852, filed on Jan. 23, 2023.

(56) References Cited

OTHER PUBLICATIONS

Karim, et al., "Towards UV-curable inkjet printing of biodegradable poly (lactic acid) fabrics", In Journal of Materials Science, vol. 50, No. 13, Apr. 11, 2015, 10 Pages.

Seung-Woo, Lee, Journal of Korean Science and Technology, "UV-curing Behaviors and Mechanical Properties ofbrUV-cured Poly lactic Acid" year 2013, 7 pgs.

\* cited by examiner

US 12,097,654 B1

DEFLECTING MEMBER FOR MAKING FIBROUS STRUCTURES

CROSS REFERENCE TO RELATED APPLICATION

This application is a continuation of, and claims priority under 35 U.S.C. § 120 to, U.S. patent application Ser. No. 17/847,286, filed on Jun. 23, 2002, which is a continuation of, and claims priority under 35 U.S.C. § 120 to, U.S. patent application Ser. No. 15/796,067, filed on Oct. 27, 2017, now granted U.S. Pat. No. 11,396,725, issued Jul. 26, 2022, the entire disclosure of which is hereby incorporated by reference.

FIELD OF THE INVENTION

The present invention is related to methods of making deflection members for making strong, soft, and/or absorbent fibrous webs, such as, for example, paper webs. More particularly, this invention is concerned with structured fibrous webs, equipment used to make such structured fibrous webs, and processes of making such equipment.

BACKGROUND OF THE INVENTION

Products made from a fibrous web are used for a variety of purposes. For example, paper towels, facial tissues, toilet tissues, napkins, and the like are in constant use in modern industrialized societies. The large demand for such paper products has created a demand for improved versions of the products. If the paper products such as paper towels, facial tissues, napkins, toilet tissues, mop heads, and the like are to perform their intended tasks and to find wide acceptance, they must possess certain physical characteristics.

Among the more important of these characteristics are strength, softness, absorbency, and cleaning ability. Strength is the ability of a paper web to retain its physical integrity during use. Softness is the pleasing tactile sensation consumers perceive when they use the paper for its intended purposes. Absorbency is the characteristic of the paper that allows the paper to take up and retain fluids, particularly water and aqueous solutions and suspensions. The absolute quantity of fluid a given amount of paper will hold is important, but also the rate at which the paper will absorb the fluid. Cleaning ability refers to a fibrous structures' capacity to remove and/or retain soil, dirt, or body fluids from a surface, such as a kitchen counter, or body part, such as the face or hands of a user.

Through-air drying ("TAD") papermaking belts comprising a reinforcing member and a resinous framework, and/or the fibrous webs made using these belts, are known and described, for example, in commonly assigned U.S. Pat. No. 4,528,239, issued Jul. 9, 1985 to Trokhan. Trokhan teaches a belt in which the resinous framework is joined to the fluid-permeable reinforcing member (such as a woven structure, or a felt). The resinous framework may be continuous, semi-continuous, comprise a plurality of discrete protuberances, or any combination thereof. The resinous framework extends outwardly from the reinforcing member to form a web-side of the belt (i.e., the surface upon which the web is disposed during a papermaking process), a backside opposite to the web-side, and deflection conduits extending there between. The deflection conduits provide spaces into which papermaking fibers deflect under application of a pressure differential during a papermaking process. Because of this quality, such papermaking belts are also known in the art as "deflection members."

An improvement on deflection members to be used as papermaking belts to provide paper having increased surface area is disclosed in commonly assigned U.S. patent application Ser. No. 15/132,291, filed Apr. 19, 2016 in the name of Manifold et al., teaching deflection members made via additive manufacturing, such as 3-D printing.

However, the deflection members and processes of Manifold et al. can be improved in areas related to the economical commercialization of processes regarding commercial papermaking machines or commercial nonwoven making. Improvements can be made with respect to the size of an additively manufactured deflection member and its durability when used to make a fibrous web. Papermaking processes, for example, can require belts as wide as 110 or 220 inches and as long as 60 meters, and can be required to endure extreme temperatures, tensions, and pressures in a cyclic process.

Accordingly, there is an unmet need for a deflection member having a three-dimensional topography afforded by additive manufacturing on which fibrous webs can be formed, and which can endure the processing environment of a fibrous web making machine.

Additionally, there is an unmet need for a method for making a deflection member having a three-dimensional topography afforded by additive manufacturing on which fibrous webs can be formed, and which can endure the processing environment of a fibrous web making machine.

Additionally, there is a need for improved nonwovens for use as topsheets in baby care and fem care products. Accordingly, there is an unmet need for a deflection member having a three-dimensional topography afforded by additive manufacturing on which nonwoven webs can be formed, and which can endure the processing environment of a nonwoven web making machine. Further, there is an unmet need for a method for making a deflection member having a three-dimensional topography afforded by additive manufacturing on which nonwoven webs can be formed, and which can endure the processing environment of a nonwoven web making machine.

DETAILED DESCRIPTION

Figure 1:
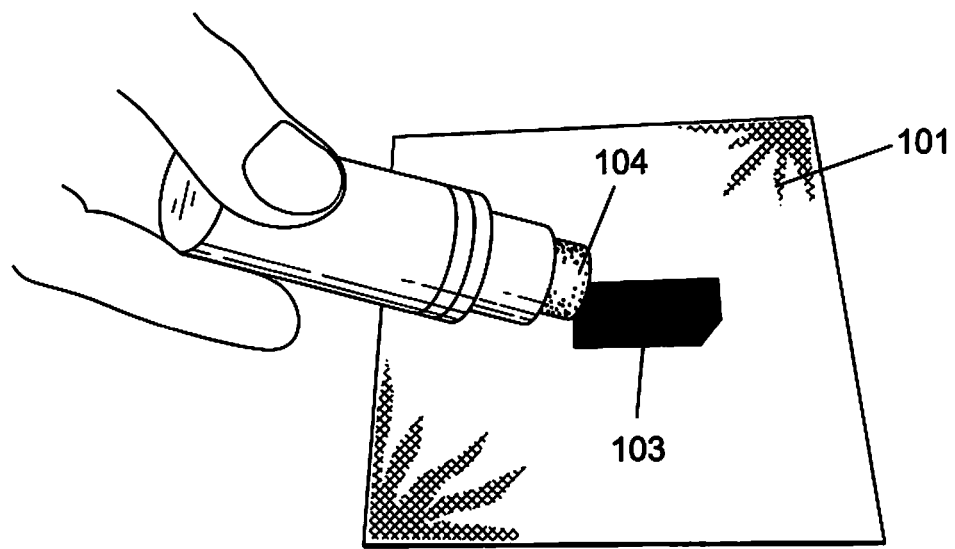
FIG. 1 illustrates a print plate with an adhesive applied.

Embodiments described herein can be understood more readily by reference to the following detailed description, examples, and drawings. Elements, apparatus and methods described herein, however, are not limited to the specific embodiments presented in the detailed description, examples, and drawings. It should be recognized that these embodiments are merely illustrative of the principles of the present invention. Numerous modifications and adaptations will be readily apparent to those of skill in the art without departing from the spirit and scope of the invention.

The terms "three dimensional printing system," "three dimensional printer," "printing," and the like generally describe various solid freeform fabrication techniques for making three dimensional (3D) articles or objects by selective deposition, jetting, fused deposition modeling, bonded deposition modeling, and other techniques now known in the art or that may be known in the future that use a build material or print material to fabricate the three dimensional object.

As understood by one of ordinary skill in the art and as described further herein, 3D printing can include selectively depositing layers of a fluid build or print material to form a 3D article on a substrate such as a print pad. In general, a fluid print material can be deposited onto a print pad through a dispenser, which may be a nozzle through which a print material is fed and dispensed from the exit of the dispenser. Any print material not inconsistent with the objectives of the present invention may be used. In some embodiments, the print material comprises cross-linkable polymers or alternatively composite materials that include cross-linkable polymers and filler materials. For example, in some forms detailed herein, the print material includes cross-linkable polymers selected from light activated polymers (e.g., UV light activated, e-beam activated, etc.), heat activated polymers, multipart polymers, moisture activated polymers, chemically activated polymers, and combinations thereof. In some deflection members, the utilized print material may include any of the cross-linkable polymers as described in U.S. Pat. No. 4,514,345 issued Apr. 30, 1985 in the name of Johnson et al., and/or as described in U.S. Pat. No. 6,010,598 issued Jan. 4, 2000 in the name of Boutilier et al. In other deflection members, the utilized print material may include any of the cross-linkable polymers as described in U.S. Pat. No. 7,445,831 issued Nov. 4, 2008 in the name of Ashraf et al. Other suitable cross-linkable and filler materials may also be used as a print material.

The present disclosure is directed towards a system and method for making deflection members by printing print materials that include cross-linkable polymers directly to permeable materials with a strong bond. The term "permeable" may be used to refer generally to any material or structure that allows the liquid state cross-linkable polymer being used to print a portion of the deflection member to pass at least partially through or be at least partially absorbed. The permeable materials can be a porous material such as textiles, fabrics, knits, woven materials, mesh, polymers, rubbers, foams, etc. The porous materials can be in the form of a flexible cloth, a sheet, a layer and other structures. In some non-limiting forms, the permeable material is a woven sheet of filaments and the filaments are made of synthetic fibers, metallic fibers, carbon fibers, silicon carbide fibers, fiberglass, mineral fibers, and/or polymer fibers including polyethylene terephthalate ("PET") or PBT polyester, phenol-formaldehyde (PF); polyvinyl chloride fiber (PVC); polyolefins (PP and PE); acrylic polyesters; aromatic polyamids (aramids) such as Twaron®, Kevlar® and Nomex®; polytetrafluoroethylene such as Teflon® commercially available from DuPont®; polyethylene (PE), including with extremely long chains/HMPE (e.g. Dyneema or Spectra); polyphenylene sulfide ("PPS"); and/or clastomers. In one non-limiting form, the woven filaments of the permeable material are filaments as disclosed in U.S. Pat. No. 9,453,303 issued Sep. 27, 2016 in the name of Aberg et al. The permeable material in some forms may include woven filaments that exhibit a diameter of about 0.20 mm to about 1.2 mm, or about 0.20 mm to about 0.55 mm, or about 0.35 mm to about 0.45 mm. The permeable material may be manufactured by traditional weaving processes, or through other processes such as additive manufacturing, e.g., 3-D printing.

In one form, a Syringe Delivery System (SDS) using material extrusion and thermal- or light- or moisture- or chemical-induced polymerization type 3D printer can be used to print 3D objects directly onto the porous materials in order to create the deflection member. A design file representing the 3D object designs can be stored or provided to the fused deposition modeling printer. The design file can include data for many parallel planar layers of the 3D object that are bonded to form the complete deflection member or portion of the deflection member. The 3D object can be printed using an "additive" process where a filament supplies print material including cross-linkable polymer to a print head, which is precisely moved to create each layer of the 3D object from the design file as the print material is emitted from the print head. The cross-linkable polymer can be printed directly onto the permeable material placed in the 3D printer.

With reference to FIG. 1, in one form, an area of the print plate surface 101 can be coated with an adhesive 103 using a sponge tip applicator 104. In one form, an adhesive 103 coating thickness of 0.05-0.1 millimeter can be applied to a print plate 101 of the 3D printer. A suitable adhesive 103 is described in U.S. Patent Publication No. 2013/0310507, "Adhesive For 3D Printing" which is hereby incorporated by reference in its entirety. The adhesive 103 can be applied to an area of the print plate 101 that is about the size of the first layer of the 3D object that is printed onto the permeable material.

Figure 2:
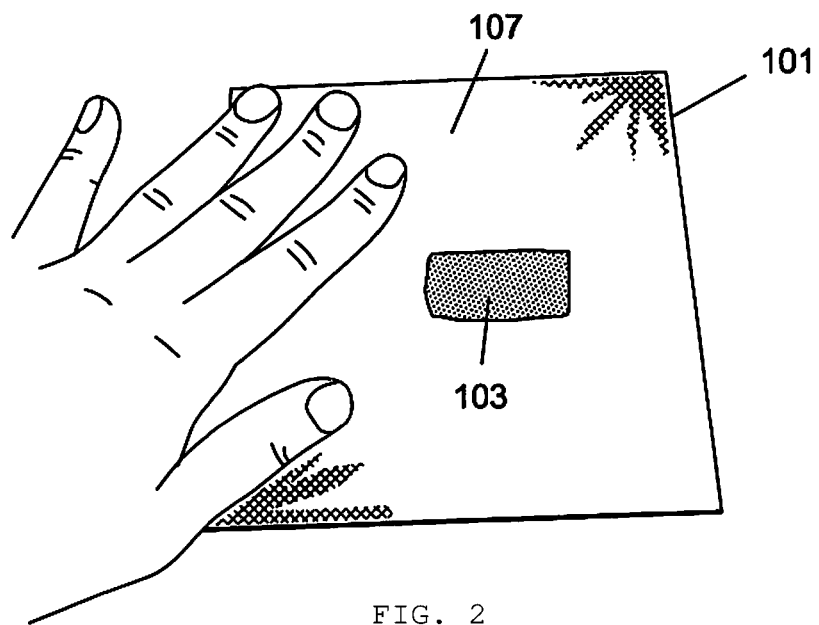
FIG. 2 illustrates a permeable material placed over the adhesive on the print plate.

With reference to FIG. 2, a sheet of permeable material 107 is placed on the print plate 101 over the adhesive 103. In this example, the permeable material 107 is a layer of woven fabric. The adhesive 103 can contact and stick to the lower surface of the permeable material 107. The adhesive 103 can function to hold the print area of the permeable material 107 stationary on the print plate 101 during the 3D printing process. Although this form uses the adhesive 103 to hold the permeable material 107 in place, in other forms any other types of mechanism can be used to hold the permeable material 107 in place such as clips or other fasteners mounted on the print plate 101 or other types of systems such as air fans directing an air flow at the permeable material 107 and the print plate 101.

Figure 3:
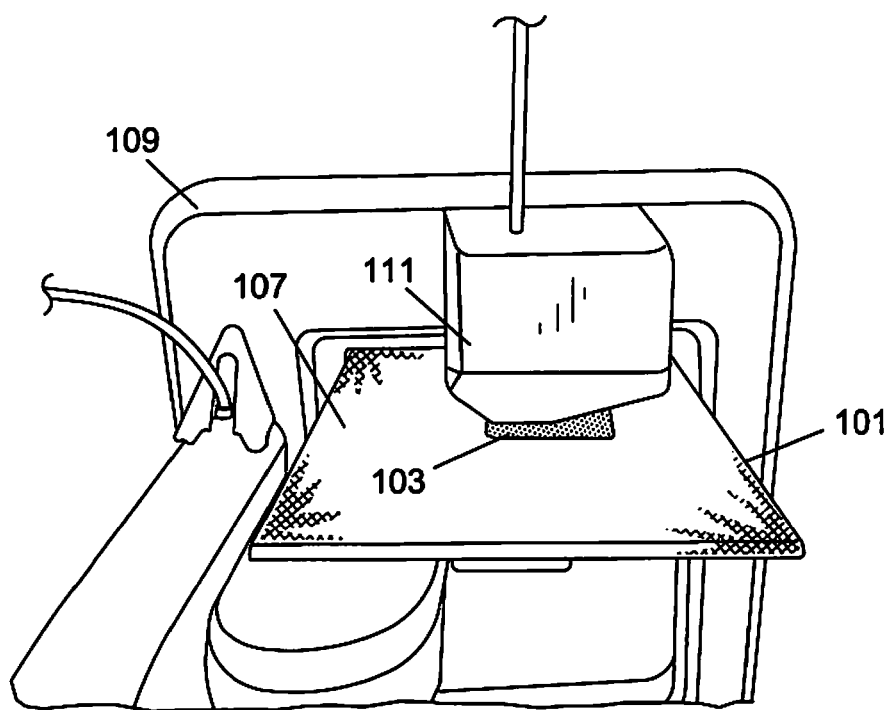
FIG. 3 illustrates a 3D printer depositing material on a permeable material.

With reference to FIG. 3, the print plate 101 can be installed in the 3D printer 109 and the position of the print head 111 can be vertically positioned over the permeable material 107 and the adhesive 103. The output nozzle of the print head 111 can be positioned within 1 centimeter or less of the upper surface of the permeable material 107. Once the permeable material 107 is properly positioned and the nozzle height is set, a bonding layer of the 3D object can be printed onto the permeable material 107 at modified 3D printer settings (i.e., a first printer setting). After the bonding layer is deposited, the space between the upper surface of the bonding layer of the 3D object and the print head nozzle can be adjusted to be less than 1 centimeter or less and the first build layer of the 3D object can be deposited on the bonding layer. The first build layer and all subsequent build layers can be deposited at normal 3D printer settings (i.e., a second printer setting), for instance, having a lower material output temperature.

Print materials including cross-linkable polymers can have different 3D printer settings depending upon the type of material being printed, the permeable material being printed onto and the portion of the deflection member being printed. For example, in order to improve the adhesion of the printed 3D object onto the permeable material, the bonding layer of material printed directly onto the permeable material can use modified 3D printer settings, a.k.a. first print setting. The modified 3D printer settings used for the bonding layer can be different than the normal 3D printer settings, a.k.a., second printer setting, used to print other build layers of the 3D object being printed. For example, the flow rate of the bonding layer of material printed directly onto the permeable material can be higher than the normal build layer flow rate for the material being printed. In another example, the viscosity of the bonding layer of material printed directly onto the permeable material can be lower than the normal build layer flow rate for the material being printed. In another example, the print temperature of the bonding layer of material printed directly onto the permeable material can be higher than the normal build layer print temperature for the material being printed. In another example, the dwell time of the bonding layer of material printed directly onto the permeable material can be higher than the normal build layer flow rate for the material being printed. In another example, the bonding layer of material printed directly onto the permeable material can be a different material than the normal build layer. Again, what is referred to as a normal 3D printer setting can also be referred to herein as a "second printer setting", and what is referred to herein as a modified 3D printer setting (higher/lower/different) can also be referred to herein as a "first printer setting."

In this example, the print flow rate of the print material including UV curable polymer in the first layer printed directly onto the permeable material is higher than normal. Some of the material printed directly onto the permeable material can be absorbed by the material or flow through the permeable material. In order to compensate for this material that flows into the permeable material, the material flow rate for the bonding layer can be higher than the normal material flow rate (i.e., a modified material flow rate or first printer setting) for the formation of subsequent build layers or layers formed on a print plate.

In other forms, the modified flow rate of the print material including UV curable polymer material printed directly onto the permeable material can depend upon the absorption rate of the permeable material. A material that has a low porosity or a lower permeability volume can have a lower material flow rate than a material that is very porous or has a high permeability volume. Thicker permeability materials may require a higher flow rate than a thinner permeable material. Thus, in an embodiment, the 3D printer settings can be based upon the material being used to print and the permeable material which is being printed on. The optimum 3D printer settings can be determined empirically through experimentation and adhesion testing of 3D objects printed onto the permeable materials.

Once the bonding layer of cross-linkable polymer material has been printed onto the permeable material, the print head can be repositioned vertically relative to the print plate and additional build layers can be printed on the completed bonding layer. For these subsequent build layers the 3D printer settings can be changed back to the normal settings (i.e., second printer setting) with a lower material print temperature. After each build layer of the 3D object is printed the relative position of the print head and the print plate can be increased and an adjacent new build layer can be printed on the previously printed build layer according to the design data. This process can be repeated until the 3D object is completely formed.

Figure 4:
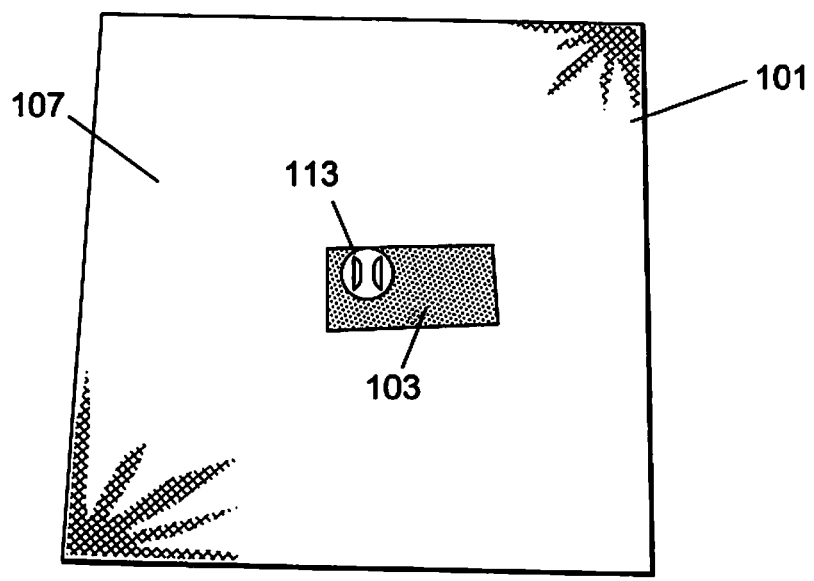
FIG. 4 illustrates a print plate with a 3D object printed on a permeable material.

In this example with reference to FIG. 4, the print plate 101 has been removed from the 3D printer and the 3D object 113 printed on the permeable material 107 is a connector. In one form, the adhesive can be water-soluble. For example, the adhesives, in some forms, may comprise a polymeric component that can include a water-soluble polymer such as an ionic polymer, a polar polymer, or a hydrophilic polymer. In other forms, it may be possible to separate the 3D objected from the print plate 101 using other methods. For example, a tool such as a scraper having a thin blade, can be slid across the surface of the print plate 101 to separate all 3D object 113 that have been printed on the print plate 101. If an adhesive is not used to secure the permeable material 107 to the print plate 101, the connection mechanism being used can be released or turned off, such as clips, fasteners, air flow, etc.

Figure 5:
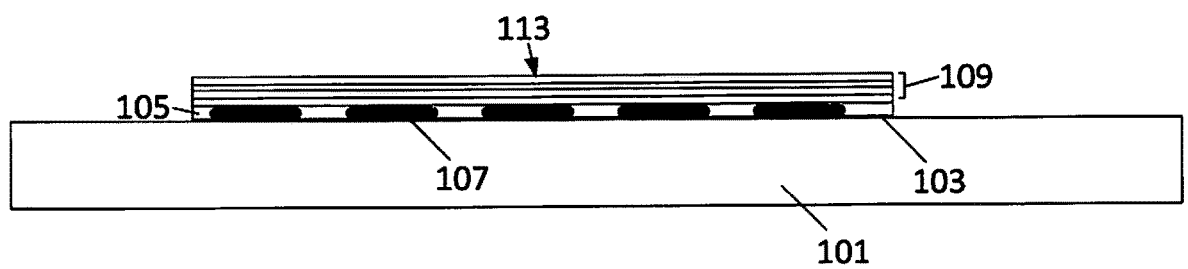
FIG. 5 illustrates a cross section of a 3D object printed on a permeable material.

With reference to FIG. 5, a cross section of a lower portion of the 3D object 113 printed on a permeable material 107 is illustrated. The permeable material 107 can be held in a stationary position on the print plate 101 with an adhesive 103. The first layer 105 of the 3D object 121 can be hotter than normal and have a lower viscosity. Thus, the bonding layer 105 can be absorbed by the permeable material 107 and the bonding layer 105 material can flow through pores in the permeable material 107. This absorption or saturation of the permeable material 107 with the bonding layer 105 can improve the bonding strength of the 3D object to the permeable material 107. The subsequent build layers 109 of the printed at normal 3D printer settings (i.e., second print setting) which can have a lower deposition temperature than the bonding layer 105.

Figure 6:
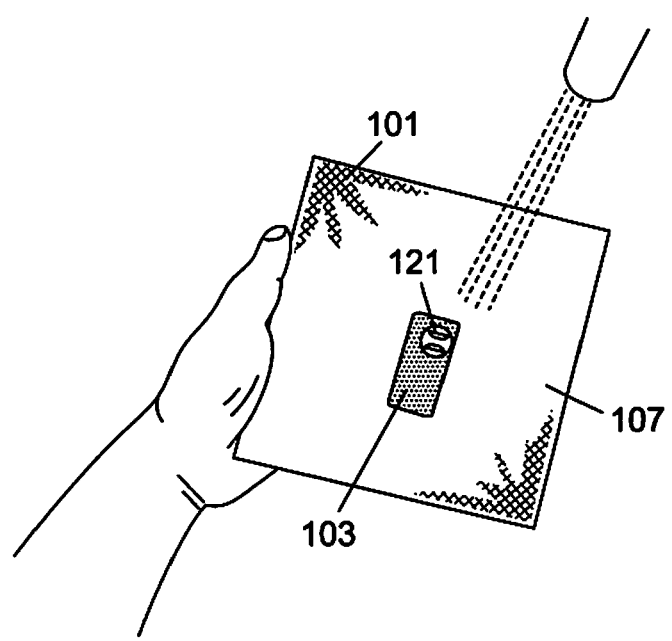
FIG. 6 illustrates a 3D object printed on a permeable material being separated from a print plate.

With reference to FIG. 6, the print plate 101 with the permeable material 107 and printed 3D object 121 connector can be placed in water to dissolve the adhesive 103. After the adhesive 103 is dissolved, the permeable material 107 with the attached connector 121 can be removed from the print plate 101.

Figure 7:
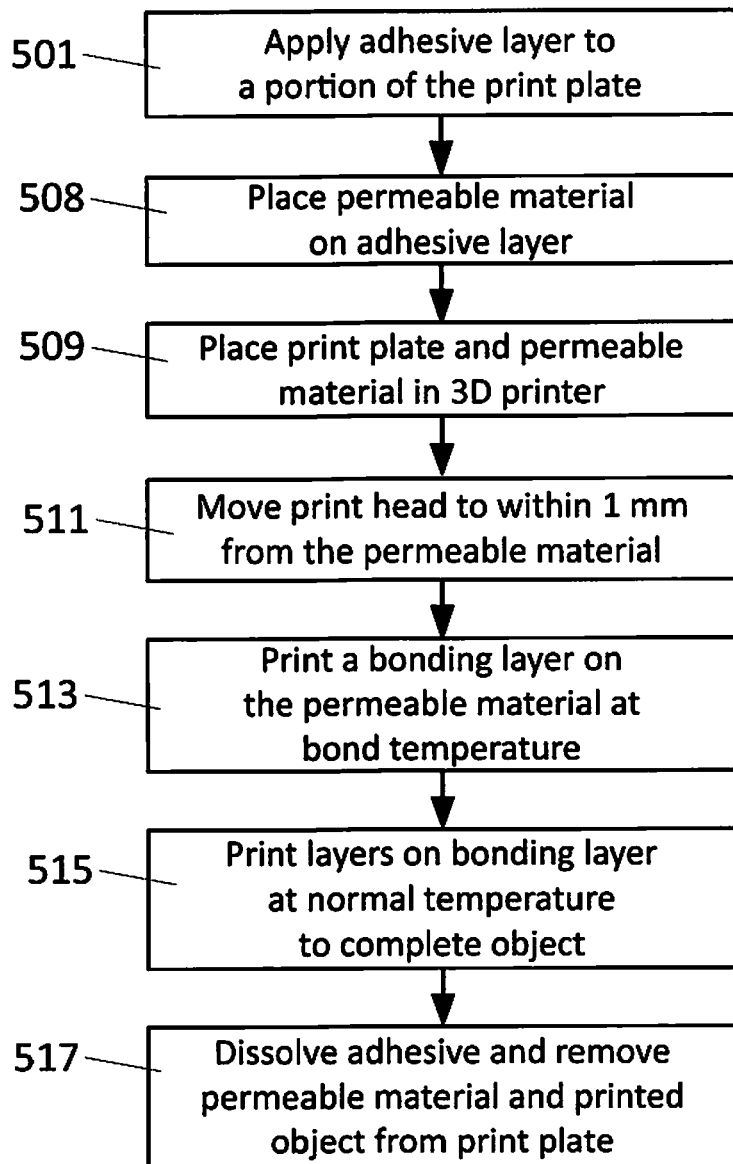
FIG. 7 illustrates flow chart of a process for printing a 3D object onto a permeable material.

In one form wherein first printer setting is a first output temperature (e.g., "bond temperature") and second printer setting is a second output temperature (e.g., "normal temperature"), with reference to FIG. 7, a flow chart illustrating steps for printing a 3D object onto a permeable material with improved bonding between a permeable material and the 3D printed object is shown. At step 501, an adhesive material is applied to the print plate as illustrated in FIG. 1. At step 508, the permeable material is placed on the adhesive layer as shown in FIG. 2. At step 509, the print plate and permeable material are placed in the 3D printer. At step 511 the print head of the 3D printer is moved within 1 centimeter or less such as within 1 millimeter of the permeable material. At step 513 the 3D printer prints a bonding layer directly on the permeable material at bond layer printer settings which, for instance, has a higher material temperature, flow rate. At step 515, additional build layers are printed on the bonding layer to complete the 3D object. At step 517 remove print plate from the 3D printer and use water to dissolve the adhesive and then remove the permeable material and 3D printed object from the print plate. In other contemplated but non-illustrated forms, first printer setting and second printer setting may be directed towards output flowrates and/or a second material.

Figure 8:
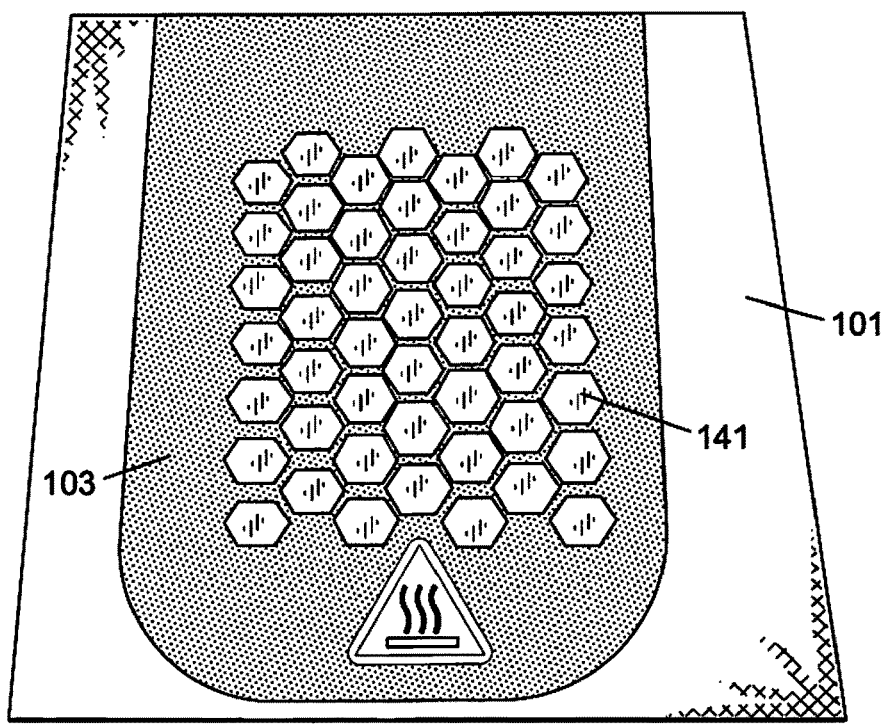
FIG. 8 illustrates a print plate with under structures.
Figure 9:
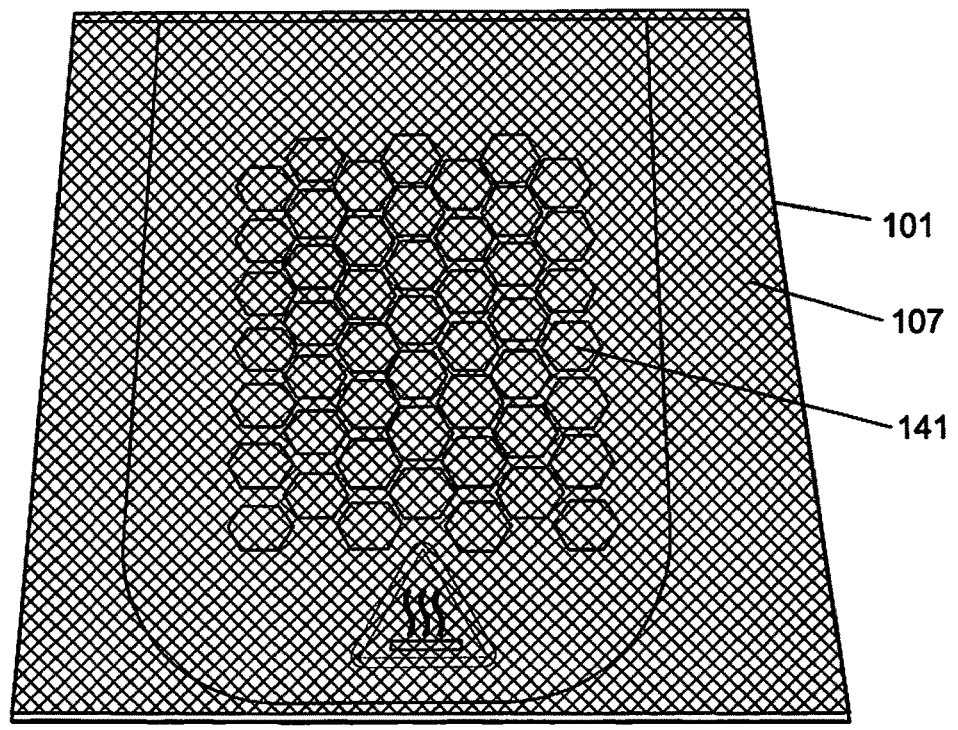
FIG. 9 illustrates a permeable material placed on the under structures and print plate.

In other forms, different processes can be used to securely print 3D objects to a permeable material. With reference to FIG. 8, a print plate 101 is illustrated that is covered with a layer of an adhesive 103. A plurality of under structures 141 have been printed on the adhesive layer 103 by a 3D printer at normal printer settings. Although the under structures 141 appear to have a significant thickness of possibly 0.1-0.25 inch, in other forms, the under structure can be very thin. For example, the under structure can be just one layer of deposited material having a thickness of less than 0.001 inch. With reference to FIG. 9, a permeable material 107 has been placed on the plurality of under structures 141. In this example, the permeable material 107 is a sheet of material with a plurality of large through holes so the under structures are visible through the holes in the permeable material.

Figure 10:
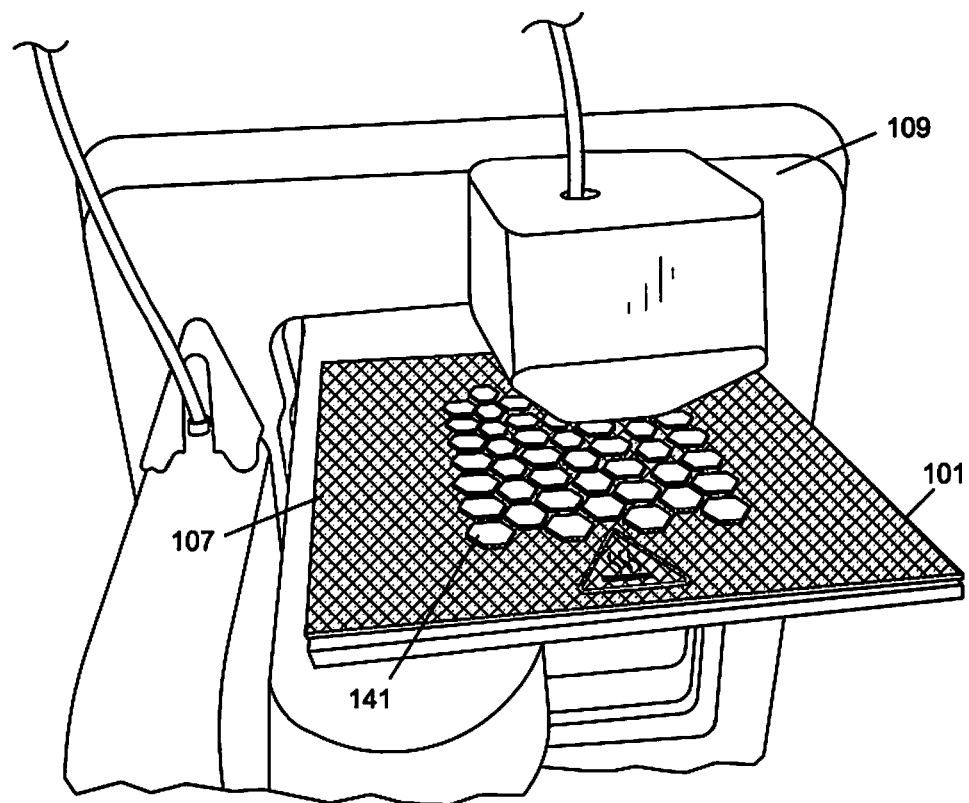
FIG. 10 illustrates the permeable material, under structure and print plate in a 3D printer.

With reference to FIG. 10, the under structures 141, permeable material 107 and print plate 101 have been placed in a 3D printer 109. A bonding layer 143 is printed directly on the permeable material 107 and the under structures 141. The bonding layer 143 can be deposited at modified printer setting (i.e., a first printer setting) which include a higher deposition temperature. The print material including cross-linkable polymer of the bonding layer 143 can flow through orifices in the permeable material 107 and bonded with the under structure 141. Thus, the under structure 141 and the bonding layer 143 can be bonded through the orifices in the permeable material 107. Additional build layers 145 are printed on the bonding layer 143 at normal printer settings (i.e., second printer setting) until the 3D objects 147 are completed.

Figure 16:
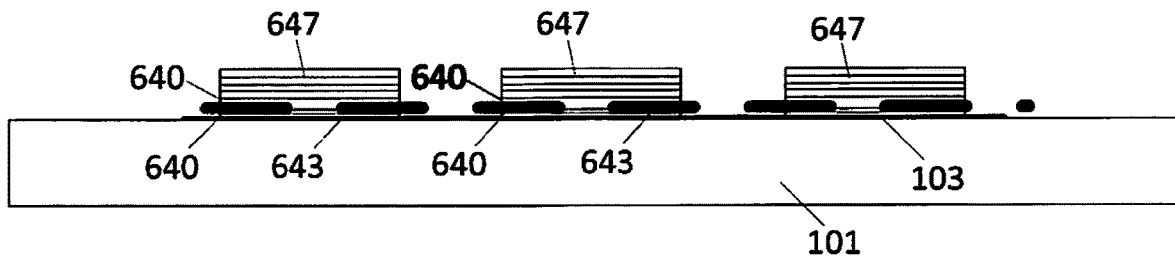
FIG. 16 illustrates a side view of an embodiment of an object bonded to a permeable material with a first heat seal layer.

After the 3D objects 147 are printed, the 3D objects 147 and permeable material 107 can be separated from the print plate 101 as illustrated in FIG. 16. In an embodiment, the print plate 101 can be exposed to water to dissolve the adhesive 103. After the adhesive 103 is dissolved, the 3D objects 147 and permeable material 107 can be separated from the print plate 101. In other forms, it may be possible to separate the 3D objected from the print plate 101 by using a tool such as a scraper which can be forced across the surface of the print plate 101 to separate all materials that have been printed on the print plate 101. Again, if the adhesive 103 is not used, the coupling mechanism being used can be released to separate the permeable material 107 from the print plate 101.

Figure 12:
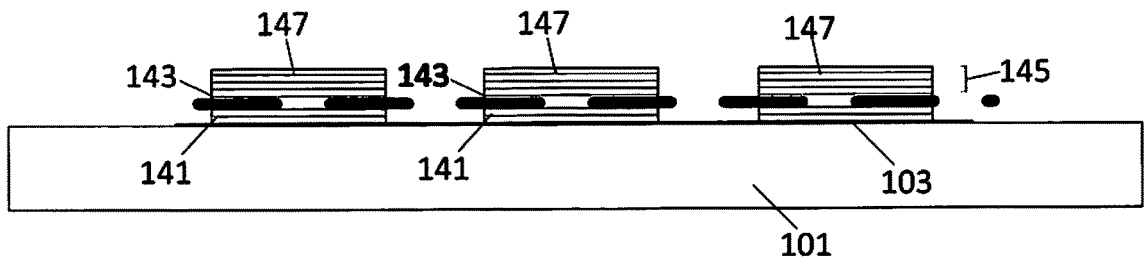
FIG. 12 illustrates a cross section of a 3D object printed on a permeable material.

FIG. 12 illustrates an embodiment of a cross section of the 3D objects 147 printed on the adhesive 103 on the print plate 101. The permeable material 107 is placed over the under structures 141 and the bonding layer 143 which can be deposited at a hotter temperature can flow through the permeable material and bond to the under structure 141—at a first printer setting. Additional layers are deposited on the bonding layer 143 to complete the 3D objects 147—at a second printer setting.

Figure 11:
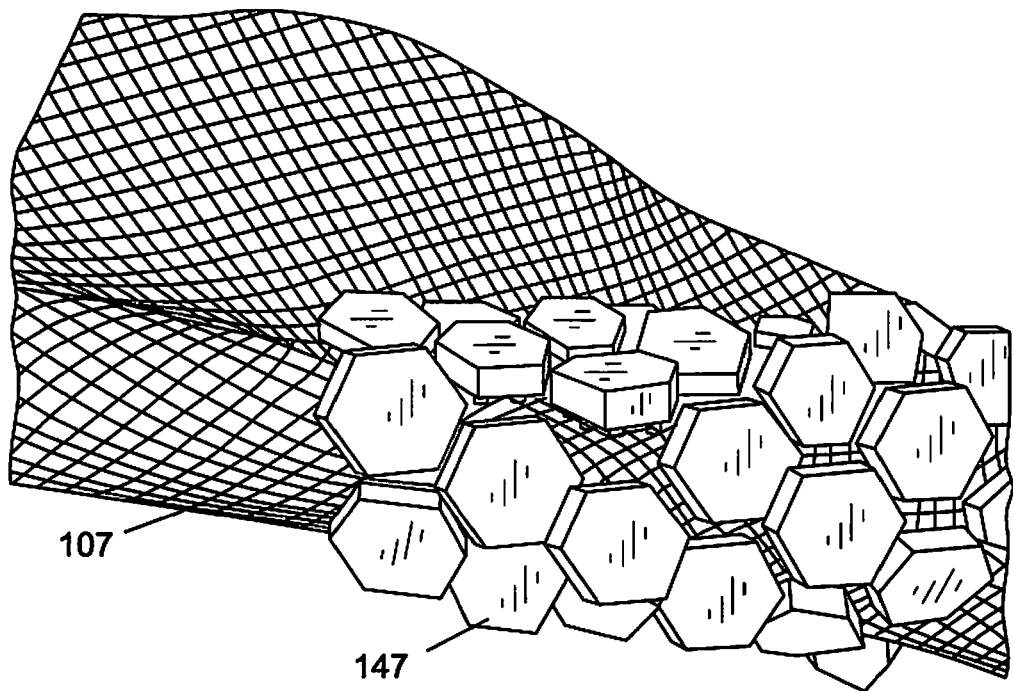
FIG. 11 illustrates 3D objects printed on a permeable material.
Figure 13:
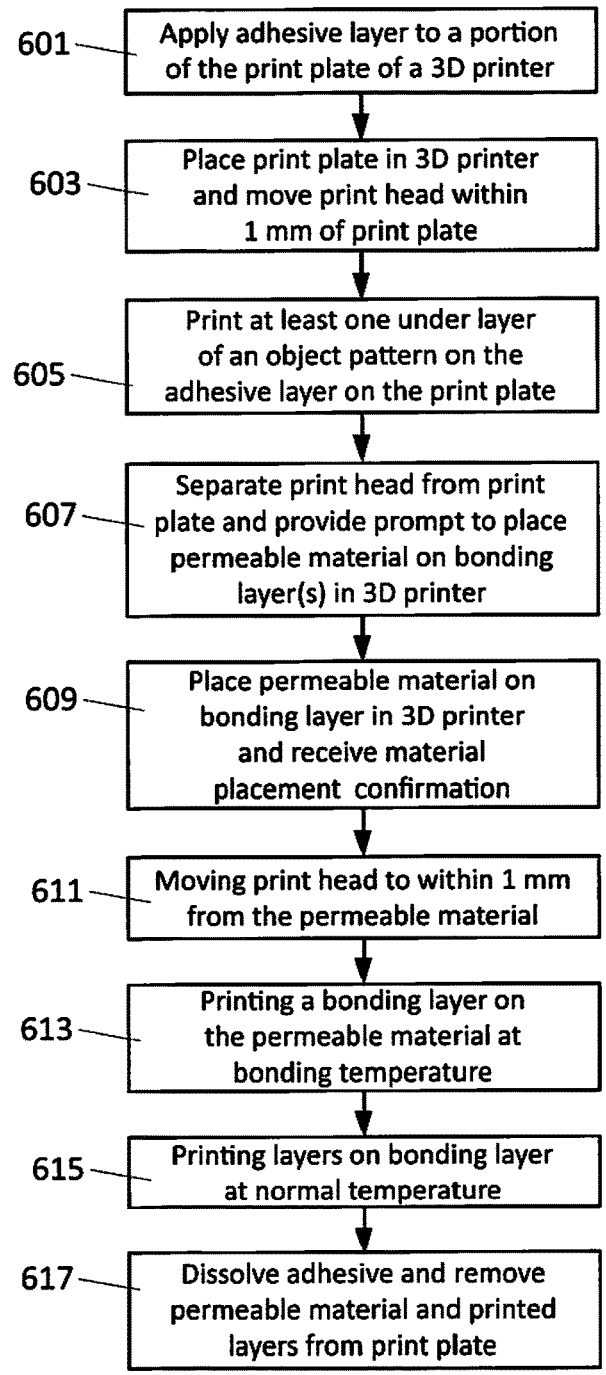
FIG. 13 illustrates flow chart of a process for printing a 3D object onto a permeable material.

In one form wherein first printer setting is a first output temperature (e.g., "bond temperature") and second printer setting is a second output temperature (e.g., "normal temperature"), with reference to FIG. 13, a flow chart illustrating steps in an alternative method for printing a 3D object onto a permeable material with improved bonding between a permeable material and the 3D printed object. At step 601, an adhesive material is applied to the print plate. At step 603, the print plate and adhesive layer are placed in a 3D printer and the print head of the 3D printer is moved within 1 centimeter or less, possibly within about 1 millimeter of the adhesive layer on the print plate. At step 605, the 3D printer prints an under structure(s) which is at least one layer thick on the print plate as shown in FIG. 8. At step 607, after the under structure(s) is printed the print head is separated from the print plate so that there is sufficient space for the permeable material to be inserted on the under layer in the 3D printer. At step 609, the permeable material is placed on the under structures in the 3D printer as shown in FIG. 9. The 3D printer operator may press a confirmation button to inform the printer that the permeable material is in place and the distance between the print head and the permeable material can be decreased. At step 611 the print head of the 3D printer is moved within 1 centimeter or less such as within 1 millimeter of the permeable material as shown in FIG. 10. At step 613 the 3D printer prints a bonding layer directly on the permeable material at modified printer settings (i.e., first printer setting) which can have a higher material output temperature. The higher temperature can cause the bonding layer to flow through the permeable material and bond to the under layer. At step 615, print additional build layers are printed at a second printer setting on the bonding layers to complete the 3D object. At step 617 remove print plate from the 3D printer and use water to dissolve the adhesive and then remove the permeable material and printed object from the print plate as shown in FIG. 11. In other contemplated but non-illustrated forms, first printer setting and second printer setting may be directed towards output flowrates and/or a second material.

Figure 14:
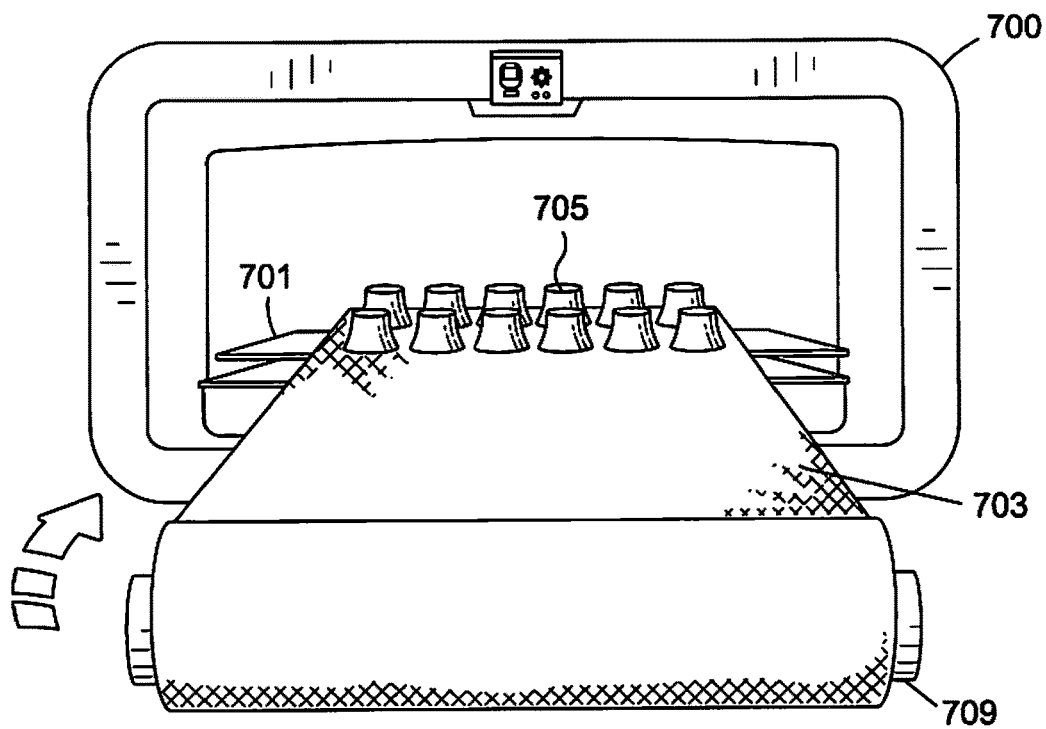
FIGS. 14-15 illustrate embodiments of 3D printers for printing 3D objects onto rolls of permeable materials.

In the described forms, the process for 3D printing onto a permeable material has been described as a single printing job process wherein the permeable material is completely removed from the 3D printer when each 3D printing job is complete. However, it is also possible to print multiple 3D objects onto a single piece of material or a roll 709 of permeable material. With reference to FIG. 14, a 3D printer 700 is illustrated that includes a roll of permeable material 703 and a mechanism to feed the permeable material 703 onto the print pate 701 and through the printing region of the 3D printer 700. In this form, an unprinted portion of the permeable material 703 can be positioned on the print plate 701 and held stationary during the 3D printing process.

In the illustrated form, the permeable material 703 can be stored on a roll on one side of the 3D printer 700. The rollers 709 can hold the permeable material in tension on the print plate 701. The permeable material 703 can be temporarily secured to the print plate 701 with a mechanism such as clamps, vacuum or other securing mechanisms. In the clamp embodiment, clamp mechanisms can compress and secure a portion of the permeable material 703 against the print plate 701 throughout the 3D print process. When the 3D object 705 has been printed on the permeable material 703, the clamp mechanisms can be released so that the permeable material 703 can be moved.

In the vacuum embodiment, the print plate 701 may have a plurality of vacuum holes. A vacuum pump can be coupled to the holes and the vacuum pump can draw air in from the print plate 701 surface creating a vacuum force that can cause the permeable material 703 to be held securely against the print plate 701. The vacuum can be applied throughout the 3D print process. When the 3D object(s) 705 has been printed, the vacuum pump can be turned off and the vacuum force can be removed to allow the permeable material 703 to be moved over the print plate 701. Once the permeable material 703 is repositioned in the 3D printer 700, the vacuum can be applied to secure the permeable material 703 against the print plate 701 and the 3D print process can be repeated.

In other embodiments, the weight of the permeable material 703 and friction between the print plate 701 and the permeable material 703 can be sufficient to hold the permeable material 703 in a stationary position on the print plate 701 during the 3D printing process. Thus, an adhesive may not be necessary to hold the permeable material 703 in a stationary position on the print plate 701.

A bonding layer of print material can be printed directly onto the permeable material 703 at a higher than normal print material temperature and/or a higher flow rate (i.e., a first print setting). After the bonding layer is printed, the 3D printer settings can be changed back to normal printer settings (i.e., second printer setting) and subsequent build layers can be deposited on the bonding layer at a lower temperature and/or lower flowrate and/or using the build material. The subsequent layers can complete a first group of objects 705 printed on the permeable material 703 in the 3D printer 700. Once the 3D objects 705 are printed on the permeable material 703, the securing mechanisms can be released and rollers can move more of the permeable material 703 into the 3D printer 700. The new permeable material 703 can be secured to the print plate 701 and the described process can be repeated to print the 3D objects 705 as described above. The bonding layer of the 3D object can be printed at modified printer settings (i.e., first printer setting) with a higher than normal material temperature, at a higher than normal flow rate, or with a different print material. Subsequent build layers can be deposited with the normal 3D printer settings of a lower material temperature setting, a normal material flow rate, or with the material used for the build layer(s) (i.e., second printer setting).

Figure 15:
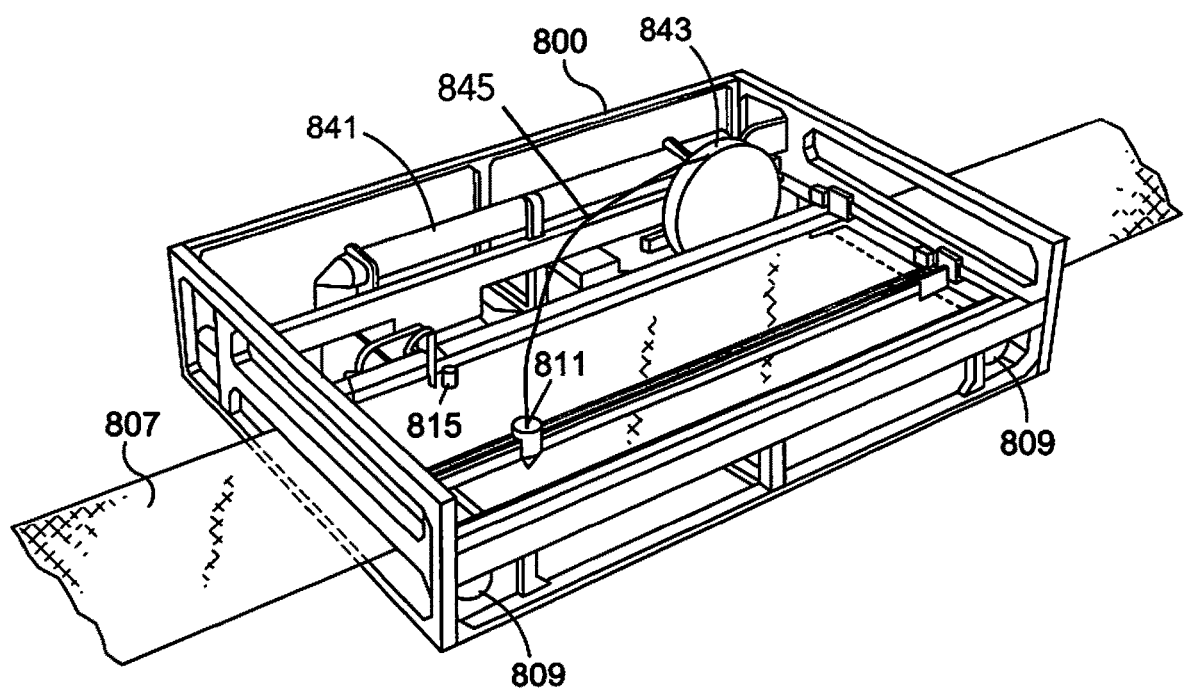

With reference to FIG. 15, another form of a permeable material 3D printer 801 is illustrated. In this form, the 3D printer 800 can include fabric rollers 809 that hold the permeable material 807 in a stationary position in the horizontal X-Y plane of the printer 800. A bonding layer of a 3D object can be printed with modified printer settings (i.e., first printer setting), such as at a higher than normal material temperature, at a higher than normal flow rate, or with a different print material. Subsequent build layers can be deposited at a normal printer settings (i.e., second printer setting). The nozzle 811 can move in a horizontal X-Y plane and deposit liquid state print material including cross-linkable polymer to form the layers of the 3D objects being printed on the permeable material 807. A supply line 845 can supply liquid state print material to nozzle 811 from a supply chamber 843. After each layer of the 3D objects has been printed, the vertical spacing between the nozzle 811 and the print plate 801 can be increased by moving the nozzle 811 vertically, or by moving the print plate 801 vertically. The layers of the objects are printed until the 3D objects have been completely formed. Once the 3D object(s) has been printed, the fabric rollers 809 can be used to move a clean portion of the porous permeable material 807 onto the print plate under the nozzle 811.

In one form, a cutter such as a laser cutter 815 and a laser tube 841 can be used to cut the permeable material 807. The laser tube 841 can produce a laser beam that is directed to the laser cutter 815 that can move in a horizontal X-Y plane and can be turned on to emit a laser beam to cut the permeable material 807. A laser cutter 815 can have controls that allow the permeable material 807 to be cut into any desired shape or simply straight across the fabric roll. The laser cutter 815 can function by directing the output of a high-power laser through optics. The laser optics can be controlled by CNC (computer numerical control) to direct the laser beam from the laser tube 841 to the laser cutter 815 for cutting the permeable material within the 3D printer 800. By actuating the laser optics with a motion control system, a CNC of the pattern can be cut onto the material. The focused laser beam is directed at the material 807, which then either melts, burns, or vaporizes away the permeable material 107 leaving an edge with a high-quality surface finish. In one form the laser cutter 815 can also be used to cut through the 3D object(s) printed on the permeable material.

The cut permeable material can be part or component of a separate assembly such as a deflection member which can have integrated 3D printed objects. For example, a deflection member for making fibrous structures may include an underlying permeable material and 3-D printed structural components printed thereon.

In another form, an ink printer mechanism can be incorporated into the 3D printer for coloring or marking portions of the permeable material 807. In this form, a print head which can include black and colored ink cartridges can be placed on a movable print head which can be moved across the permeable material 807 in the 3D printer 800. The ink printer head can move in a horizontal X-Y plane and deposit liquid ink which then dries on the permeable material 807. An ink print design can be stored in memory and the printer can print the stored design on the permeable material 807. The ink printing can function to add ornamental markings to the permeable material 807 and printed objects. Alternatively, the markings can indicate a pattern to be cut, the locations of additional components, couplings, etc. The color printing processing can occur before, during or after the 3D object is printed on the permeable material 807.

FIG. 16 illustrates an embodiment of a cross section of the 3D objects printed on the adhesive 103 on the print plate 101. The adhesive 103 can spread over the print plate 101. The adhesive 103 can contact and hold the permeable material 643 in place on the print plate 101. In some forms, a fan in the 3D printer or an external fan can direct ambient air in a downward direction to further hold the permeable material 643 to the print plate 101. The construction of the printed objects can include a heat seal layer 640 printed on a permeable material 643. The heat seal layer 640 material can flow through the pores or holes in the permeable material 643 between the print plate 101 and the permeable material 643 and surround portions of the permeable material 643. In one form, the heat seal layer 640 can be made of a print material that includes polyurethane or other cross-linkable polymers. In other embodiments, the heat seal layer 640 can be formulated from one or more materials including: adhesives that have low (about 1 to 100 cP at room temperature), medium (101 to 10000 cP at room temperature) and high viscosity (10001 to about 1000000 cP at room temperature) and may exhibit Newtonian or non-Newtonian behavior when deformed prior to curing and may exist as a liquid, gel, paste; epoxies, nonamine epoxy, anhydride-cured epoxy, amine-cured epoxy, high temperature epoxies, modified epoxies, filled epoxies, aluminum filled epoxy, rubber modified epoxies, vinyl epoxies, nitrile epoxy, single and multipart epoxies, phenolics, nitrile phenolics, nitrile phenolic elastomer, nitrile adhesives, modified phenolics, epoxy-phenolics, neoprene phenolics, neoprene phenolic elastomer, second generation acrylics, cyanoacrylates, silicone rubbers, vinyl plastisols, single and multipart polyurethanes, PBI and PI (polyimide) adhesives, acetylenic modified PI, perfluoro-alkylene modified PI, aromatic PI, perfluoro-alkylene modified aromatic PI, nylon, epoxy-nylon, polyamides, vinyl-phenolic, polyisocyanates, melamines, melamine formaldehyde, neoprenes, acrylics, modified acrylics, natural rubber (latex), chlorinated natural rubber, reclaimed rubber, styrene-butadiene rubber (SBR), carboxylated styrene butadiene copolymer, styrene butadiene, butadiene-acrylonitrile sulfide, silicone rubber, bitumen, soluble silicates, polyphenylquinoxaline, (solvent adhesive) hexafluoroacetone sesquihydrate (structural adhesive) thermosets; epoxy, polyester with isocyanate curing, styrene-unsaturated polyester, unsaturated polyesters, polyester-polyisocyanates, cyanoacrylate (non-structural adhesive) one component: rubbers, synthetic rubber, phenolic resin and/or elastomers dispersed in solvents; room temperature curing based on thermoplastic resins, rubbers, synthetic rubber, SBR (styrene phenolic resin and/or elastomers dispersed in solvents; elastomeric adhesives, neoprene (polychloroprene) rubber, rubber based adhesives, resorcinol, ethylene vinyl acetate, polyurethane, polyurethane elastomer, polyurethane rubber (bodied solvent cements) epoxies, urethanes, second generation acrylics, vinyls, nitrile-phenolics, solvent type nitrile-phenolic, cyanoacrylates, Polyvinyl acetate, polyacrylate (carboxylic), phenoxy, resorcinol-formaldehyde, urea-formaldehyde, Polyisobutylene rubber, polyisobutyl rubber, polyisobutylene, butyl rubber, nitrile rubber, nitrile rubber phenolic, modified acrylics, cellulose nitrate in solution (household cement), synthetic rubber, thermoplastic resin combined with thermosetting resin, Nylon-phenolic, vulcanizing silicones, room-temperature vulcanizing silicones, hot melts, polyamide hot melts, Epoxy-polyamide, polyamide, epoxy-polysulfide, polysulfides, silicone sealant, silicone elastomers, Anaerobic adhesive, vinyl acetate/vinyl chloride solution adhesives, PMMA, pressure sensitive adhesives, polyphenylene sulfide, Phenolic polyvinyl butyral, furans, furane, phenol-formaldehyde, polyvinyl formal-phenolic, polyvinyl butyral, butadiene nitrile rubber, resorcinol—polyvinyl butyral, urethane elastomers, PVC, polycarbonate copolymer, polycarbonate copolymer with resorcinol, siloxane and/or bisphenol-A, and Flexible epoxy-polyamides.

Additional build layers 647 can be printed over the seal layer(s) 640 to complete the printed objects on the permeable material 643. The build layers 647 can be made of a print material that includes cross-linkable polymer that is different than the seal layers 640. For example, in different embodiments, the build layers can be made of print materials that include cross-linkable polymers selected from light activated polymers (e.g., UV light activated, e-beam activated, etc.), heat activated polymers, multipart polymers, moisture activated polymers, chemically activated polymers, and combinations thereof. The build layers can be any thickness that is sufficient to complete the printing of the object.

Figure 17:
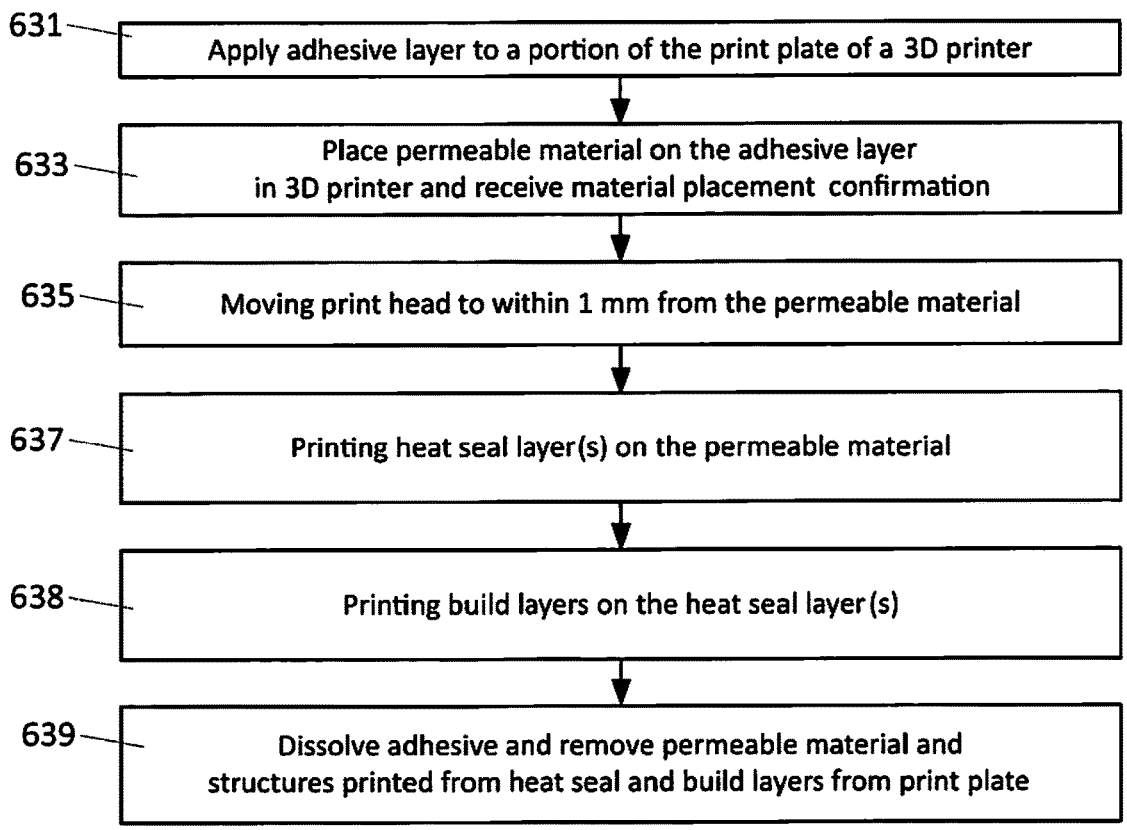
FIG. 17 illustrates an embodiment of a flow chart for creating a sandwich construction object bonded to a permeable material.

FIG. 17 illustrates an embodiment of a flow chart with process steps for printing objects onto permeable materials in a sandwich construction with improved bonding between a permeable material and the 3D printed object. At step 631, an adhesive material is applied to the print plate. At step 633, the print plate and adhesive layer are placed in a 3D printer and at step 635 the print head of the 3D printer is moved within 1 centimeter or less (such as 1 millimeter) of the adhesive layer on the print plate. At step 637, the 3D printer prints a first heat seal layer(s) which is at least one layer thick on the print plate as shown in FIG. 16. At step 638, after the first heat seal layer(s) is printed, build layers can be deposited by a print head on the first heat seal layer(s) in the 3D printer. The build layers are deposited until the objects are completely printed. At step 639, the adhesive is dissolved and the permeable material and structures printed from the heat seal and build layers is removed from the print plate. Any post printing processing steps can then be performed.

Figure 18:
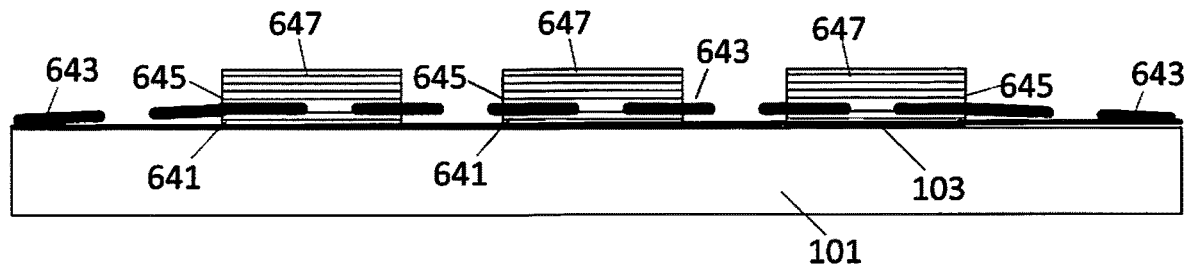
FIG. 18 illustrates side view of an embodiment of a sandwich construction object bonded to a permeable material.

FIG. 18 illustrates an embodiment of a cross section of the 3D objects printed on the adhesive 103 on the print plate 101. The construction includes a first heat seal layer 641 and a second heat seal layer 645 that are sandwiched around portions of the permeable material 643. The first heat seal layer 641 and second heat seal layer 645 can bond together through the pores or holes in the permeable material 643. The first heat seal layer 641 and the second heat seal layer 645 can be formulated from one or more of: polyurethane, nylon, polyester, vinyl and other suitable materials, as detailed above. After the first heat seal layer 641 is printed on the print plate 101, additional adhesives can be placed around the first heat seal layer 641 and the permeable material 643 can be secured to the print plate 101. In some embodiments, a fan in the 3D printer or a fan can direct ambient air in a downward direction to further hold the permeable material 643 to the print plate 101. The second heat seal layer 645 can be printed on the permeable material 643 over the first heat seal layer 641. Additional build layers 647 can be printed over the second heat seal layer 645 to complete the printed objects on the permeable material 643. The build layers 647 can be made of a print material including cross-linkable polymer that is different than the heat seal layers 641, 645. For example, in different embodiments, the build layers 647 can comprise print material that include cross-linkable polymers selected from light activated polymers (e.g., UV light activated, e-beam activated, etc.), heat activated polymers, multipart polymers, moisture activated polymers, chemically activated polymers, and combinations thereof.

Figure 19:
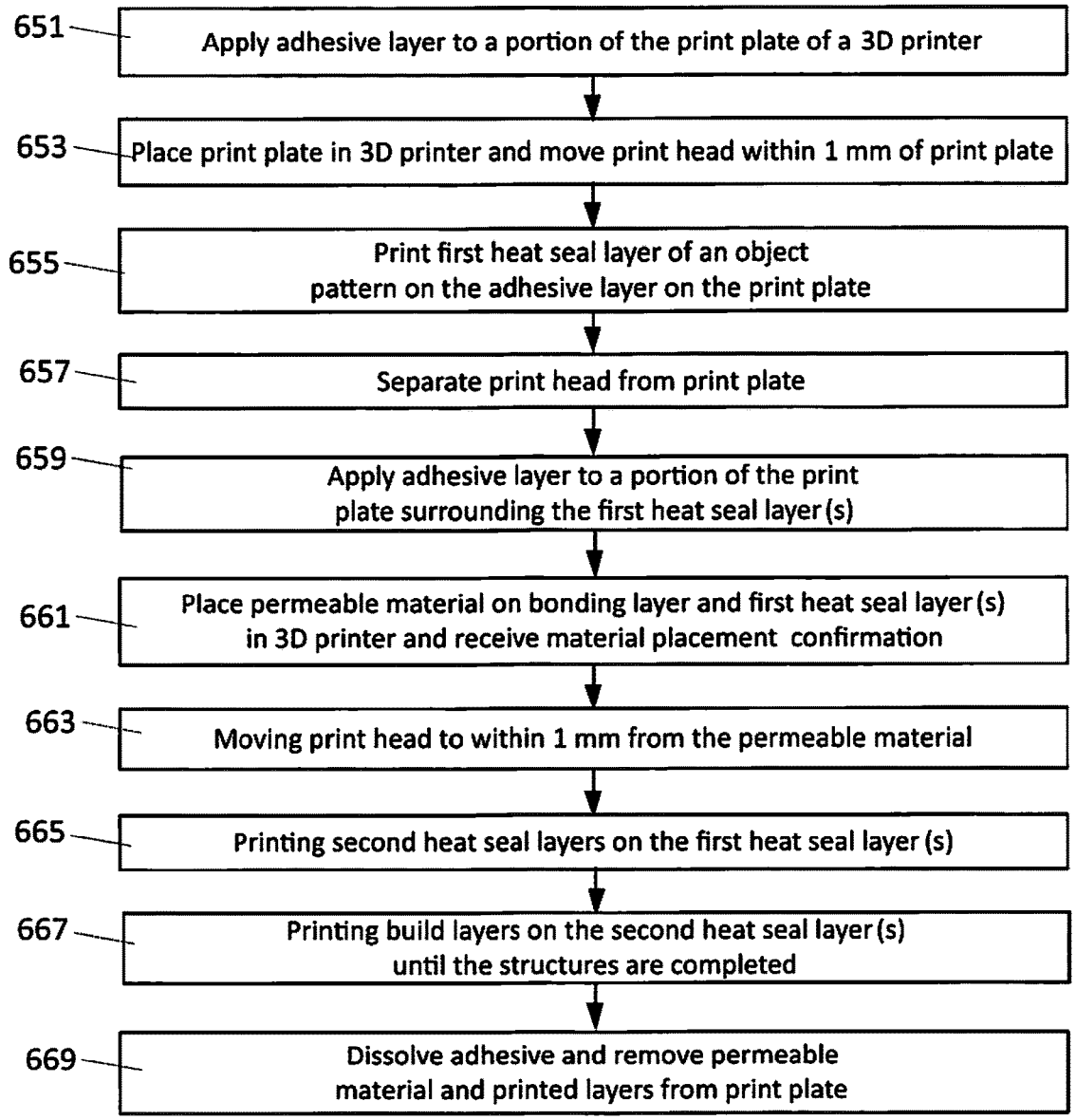
FIG. 19 illustrates an embodiment of a flow chart for creating a sandwich construction object bonded to a permeable material.

FIG. 19 illustrates an embodiment of a flow chart with process steps for printing objects onto permeable materials in a sandwich construction with improved bonding between a permeable material and the 3D printed object. At step 651, an adhesive material is applied to the print plate. At step 653, the print plate and adhesive layer are placed in a 3D printer and the print head of the 3D printer is moved within 1 centimeter or less (such as within 1 millimeter) of the adhesive layer on the print plate. At step 655, the 3D printer prints a first heat seal layer(s) which is at least one layer thick on the print plate as shown in FIG. 16. At step 657, after the first heat seal layer(s) is printed the print head is separated from the print plate so that there is sufficient space for the permeable material to be inserted on the first heat seal layer(s) in the 3D printer. At step 659, additional adhesive is placed on the print plate around the first heat seal layer(s) but not in contact with the first heat seal layer(s).

At step 661, the permeable material is placed on the first heat seal layer(s) in the 3D printer. The permeable material surrounding the first heat seal layer(s) can be held to the print plate by the adhesive applied to the print plate at step 649. In some embodiments, a fan in the 3D printer or a fan can direct ambient air in a downward direction to further hold and secure the permeable material 643 to the print plate 101 during material printing. The 3D printer operator may press a confirmation button to inform the printer that the permeable material is in place and the distance between the print head and the permeable material can be decreased. At step 663 the print head of the 3D printer is moved within 1 centimeter or less such as 1 millimeter of the permeable material. At step 665 the 3D printer prints a second heat seal layer directly on the first heat seal layer. The second heat seal layer can be printed at modified printer settings (i.e., first print setting) which can have a higher material output temperature, higher flow rate, or with a different heat seal layer material. The modified printer settings can cause the second heat seal layer material to flow through the permeable material and bond to the first heat seal material. At step 667, print additional build layers are printed on the second heat seal layer(s) at a second print setting to complete the 3D object. At step 669 remove print plate from the 3D printer and use water to dissolve the adhesive and then remove the permeable material and printed object from the print plate as previously described above with reference to FIG. 11.

In different embodiments, the three dimensional printer used to bond objects to the permeable material can have settings which can be controlled to optimize the bonding of the print materials including cross-linkable polymers onto the permeable materials. In an embodiment the three dimensional printer used for this application can be a Syringe Delivery System (SDS) as detailed herein. A STL file is created from a 3D CAD model for the desired objects to be printed onto the porous material. The STL file is an industry-standard file extension that "slices" the 3D object design into a stack of cross-sections. These cross-sections are then used to print the object. As discussed, the lower first layer(s) of the object can be heat seal layers that are made of a first print material including cross-linkable polymer for bonding the printed objects directly to the porous material using a heat seal material in the 3-D printer. Upper build layers can be printed on and bonded to the heat seal layer(s). During the printing process, the print head and the print plate of the printer can start a heating process, which may last about 10 minutes. Once the preset temperatures are reached, printing of the object can begin. The raw print material including cross-linkable polymers in the form of a thin heat seal or build material are fed through the heated print tip of the 3-D printer. The print tip with air activated adhesives, light activated adhesives, heat activated adhesives, moisture activated adhesives, multipart adhesives and combinations thereof "draws" the filament with it a cross-section of the object on the porous material or print plate as described above.

In different forms, the three dimensional printer used to bond objects to the permeable material can have settings which can be controlled to optimize the bonding of the printed heat seal layer cross-linkable polymers to the permeable materials. The print temperature of the heat seal material will vary with the rheological behaviors of the material. However, adjusting the print temperature from the normal print temperature can affect the viscosity with a higher print temperature creating a lower viscosity print material including cross-linkable polymer and a lower print temperature producing a higher viscosity print material including cross-linkable polymer. A lower viscosity material may produce better adhesion for thicker porous materials where the print material including cross-linkable polymer must flow a longer distances for proper bonding. In contrast, a thinner porous material that is less absorptive may produce better results with a lower temperature and higher viscosity print material. The volume of the heat seal layer material output by the three dimensional printer can also depend upon the thickness and porosity of the permeable material. A lower density, highly porous and thick material may require more heat seal material volume and a thin material with only small pores may require less print material than a thick permeable material with many pores.

Fibrous Structure:

One purpose of the 3D printed deflection member (produced as detailed herein) is to provide a forming surface on which to mold fibrous structures, including sanitary tissue products, such as paper towels, toilet tissue, facial tissue, wipes, dry or wet mop covers, nonwovens such as baby care and fem care topsheet materials, and the like. When used in a papermaking process, the deflection member can be utilized in the "wet end" of a papermaking process, as described in more detail below, in which fibers from a fibrous slurry are deposited on the web side surface of the deflection member. Similarly, the deflection member can be used to catch fibers in a nonwoven making process.

Thus, as can be understood from the description herein, a fibrous structure can mold to the general shape of the deflection member such that the shape and size of the three-dimensional features of the fibrous structure are a close approximation of the size and shape of the 3D objects printed on the permeable material.

Process for Making Fibrous Structure:

In one form, deflection members (3D printed objects printed upon a permeable material) as disclosed herein may be used in a nonwoven making process to capture/mold fibers in the creation of a nonwoven web, the type of which is commonly used in baby and fem care products. Such processes use forced air and/or vacuum to draw fibers down into the deflection member.

Figure 20:
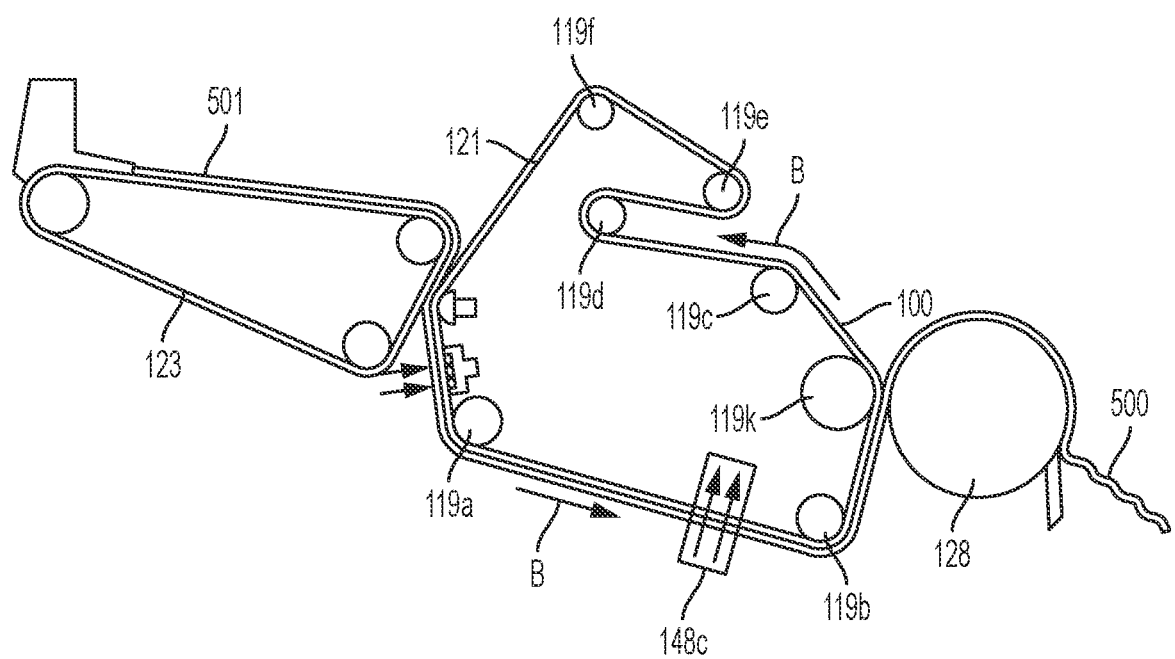
FIG. 20 is a schematic representation of a papermaking process.

In another form, deflection members as disclosed herein may be used in a papermaking process. With reference to FIG. 20, one exemplary form of the process for producing fibrous structure 500 of the present disclosure comprises the following steps, which could be employed to make a fibrous structure with deflection members produced as disclosed herein. First, a plurality of fibers 501 is provided and is deposited on a forming wire of a papermaking machine, as is known in the art.

The present invention contemplates the use of a variety of fibers, such as, for example, cellulosic fibers, synthetic fibers, or any other suitable fibers, and any combination thereof. Papermaking fibers useful in the present invention include cellulosic fibers commonly known as wood pulp fibers. Fibers derived from soft woods (gymnosperms or coniferous trees) and hard woods (angiosperms or deciduous trees) are contemplated for use in this invention. The particular species of tree from which the fibers are derived is immaterial. The hardwood and softwood fibers can be blended, or alternatively, can be deposited in layers to provide a stratified web. U.S. Pat. No. 4,300,981 issued Nov. 17, 1981 in the name of Carstens; and U.S. Pat. No.

3,994,771 issued Nov. 30, 1976 in the name of Morgan et al. are incorporated herein by reference for the purpose of disclosing layering of hardwood and softwood fibers.

The wood pulp fibers can be produced from the native wood by any convenient pulping process. Chemical processes such as sulfite, sulfate (including the Kraft) and soda processes are suitable. Mechanical processes such as thermomechanical (or Asplund) processes are also suitable. In addition, the various semi-chemical and chemi-mechanical processes can be used. Bleached as well as unbleached fibers are contemplated for use. When the fibrous web of this invention is intended for use in absorbent products such as paper towels, bleached northern softwood Kraft pulp fibers may be used. Wood pulps useful herein include chemical pulps such as Kraft, sulfite and sulfate pulps as well as mechanical pulps including for example, ground wood, thermomechanical pulps and Chemi-ThermoMechanical Pulp (CTMP). Pulps derived from both deciduous and coniferous trees can be used.

In addition to the various wood pulp fibers, other cellulosic fibers such as cotton linters, rayon, and bagasse can be used in this invention. Synthetic fibers, such as polymeric fibers, can also be used. Elastomeric polymers, polypropylene, polyethylene, polyester, polyolefin, and nylon, can be used. The polymeric fibers can be produced by spunbond processes, meltblown processes, and other suitable methods known in the art.

The paper furnish can comprise a variety of additives, including but not limited to fiber binder materials, such as wet strength binder materials, dry strength binder materials, chemical softening compositions, latexes, bicomponent fibers with a soften-able or melt-able outer shell, and thermoplastic fibers. Suitable wet strength binders include, but are not limited to, materials such as polyamide-epichlorohydrin resins sold under the trade name of KYMENE™ 557H by Hercules Inc., Wilmington, Del. Suitable temporary wet strength binders include but are not limited to synthetic polyacrylates. A suitable temporary wet strength binder is PAREZ™ 750 marketed by American Cyanamid of Stanford, Conn. Suitable dry strength binders include materials such as carboxymethyl cellulose and cationic polymers such as ACCO™ 711. The CYPRO/ACCO family of dry strength materials are available from CYTEC of Kalamazoo, Mich. Forms of fiber bonding may also be utilized, including, but not limited to, carding and hydroentangling.

The paper furnish can comprise a debonding agent to inhibit formation of some fiber to fiber bonds as the web is dried. The debonding agent, in combination with the energy provided to the web by the dry creping process, results in a portion of the web being debulked. In one form, the debonding agent can be applied to fibers forming an intermediate fiber layer positioned between two or more layers. The intermediate layer acts as a debonding layer between outer layers of fibers. The creping energy can therefore debulk a portion of the web along the debonding layer. Suitable debonding agents include chemical softening compositions such as those disclosed in U.S. Pat. No. 5,279,767 issued Jan. 18, 1994 in the name of Phan et al., the disclosure of which is incorporated herein by reference. Suitable biodegradable chemical softening compositions are disclosed in U.S. Pat. No. 5,312,522 issued May 17, 1994 in the name of Phan et al.; U.S. Pat. Nos. 5,279,767 and 5,312,522, the disclosures of which are incorporated herein by reference. Such chemical softening compositions can be used as debonding agents for inhibiting fiber to fiber bonding in one or more layers of the fibers making up the web. One suitable softener for providing debonding of fibers in one or more layers of fibers forming the web is a papermaking additive comprising DiEster Di (Touch Hardened) Tallow Dimethyl Ammonium Chloride. A suitable softener is ADOGEN® brand papermaking additive available from Witco Company of Greenwich, Conn.

The embryonic web can be typically prepared from an aqueous dispersion of papermaking fibers, though dispersions in liquids other than water can be used. The fibers are dispersed in the carrier liquid to have a consistency of from about 0.1 to about 0.3 percent. Alternatively, and without being limited by theory, it is believed that the present invention is applicable to moist forming operations where the fibers are dispersed in a carrier liquid to have a consistency less than about 50 percent.

Conventional papermaking fibers can be used and the aqueous dispersion can be formed in conventional ways. Conventional papermaking equipment and processes can be used to form the embryonic web on the Fourdrinier wire. The association of the embryonic web with the deflection member can be accomplished by simple transfer of the web between two moving endless belts as assisted by differential fluid pressure. The fibers may be deflected into the deflection member by the application of differential fluid pressure induced by an applied vacuum. Any technique, such as the use of a Yankee drum dryer or through air dryers, can be used to dry the intermediate web. Foreshortening can be accomplished by any conventional technique such as creping or rush transfer.

The plurality of fibers can also be supplied in the form of a moistened fibrous web (not shown), which should preferably be in a condition in which portions of the web could be effectively deflected into the deflection conduits of the deflection member and the void spaces formed between the suspended portions and the X-Y plane.

The embryonic web comprising fibers 501 is transferred from a forming wire 123 to a belt 121 on which the deflection member, produced as detailed herein, can be disposed by placing it on the belt 121 upstream of a vacuum pick-up shoe 148a. Alternatively or additionally, a plurality of fibers, or fibrous slurry, can be deposited onto the deflection member directly from a headbox or otherwise, including in a batch process, (not shown). The papermaking belt 100 comprising the deflection member held between the embryonic web and the belt 121 can travel past optional dryers/vacuum devices 148b and about rolls 119a, 119b, 119k, 119c, 119d, 119e, and 119f in the direction schematically indicated by the directional arrow "B".

A portion of fibers 501 can be deflected into the deflection member such as to cause some of the deflected fibers to be disposed within any voids printed in the 3D objects of the deflection member. Depending on the process, mechanical and fluid pressure differential, alone or in combination, can be utilized to deflect a portion of fibers 501 into any voids of the deflection member. For example, in a through-air drying process a vacuum apparatus 148c can apply a fluid pressure differential to the embryonic web disposed on the deflection member, thereby deflecting fibers into the deflection conduits of the deflection member. The process of deflection may be continued with additional vacuum pressure, if necessary, to even further deflect the fibers into any voids present on the deflection member.

Finally, a partly-formed fibrous structure associated with the deflection member can be separated from the deflection member at roll 119k at the transfer to a Yankee dryer 128. By doing so the deflection member, having the fibers thereon, is pressed against a pressing surface, such as, for example, a surface of a Yankee drying drum 128. After being creped off the Yankee dryer, a fibrous structure 500 results and can be further processed or converted as desired.

The present disclosure, in various embodiments, includes components, methods, processes, systems and/or apparatus substantially as depicted and described herein, including various embodiments, sub-combinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving case and/or reducing cost of implementation. Rather, as the following claims reflect, inventive aspects lie in less than all features of any single foregoing disclosed embodiment.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm." In addition, all ranges disclosed herein are to be understood to encompass any and all subranges therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

Every document cited herein, including any cross referenced or related patent or application, is hereby incorporated herein by reference in its entirety unless expressly excluded or otherwise limited. The citation of any document is not an admission that it is prior art with respect to any form disclosed or claimed herein or that it alone, or in any combination with any other reference or references, teaches, suggests or discloses any such form. Further, to the extent that any meaning or definition of a term in this document conflicts with any meaning or definition of the same term in a document incorporated by reference, the meaning or definition assigned to that term in this document shall govern.

While particular forms of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

What is claimed is:

1. A method for three-dimensional printing a print material that comprises cross-linkable polymer onto a permeable material, comprising:
   printing an under structure that has at least one layer of the print material for a three-dimensional pattern onto a print plate of a three-dimensional printer;
   increasing a distance between a print head of the three-dimensional printer and the at least one layer of the print material;
   providing a prompt to place the permeable material on the at least one layer of the print material;
   printing a bonding layer of the print material for the three-dimensional pattern onto the permeable material at a first printer setting;
   printing a build layer of the print material for the three-dimensional pattern onto the bonding layer of the material at a second printer setting, wherein the first printer setting is different from the second printer setting;
   curing, via crosslinking, the cross-linkable polymer to form a belt deflection member; and
   wherein the first printer setting includes a first material output temperature and the second printer setting includes a second material output temperature, wherein the second material output temperature is different than the first material output temperature.

2. The method of claim 1, wherein the first printer setting includes a first material flowrate and the second printer setting includes a second material flowrate, wherein the second material flowrate is different than the first material flowrate.

3. The method of claim 1, wherein portions of the bonding layer of the print material printed directly onto the permeable material flow through holes in the permeable material.

4. The method of claim 1, wherein the permeable material is a woven fabric.

5. The method of claim 1, wherein the second material flowrate is at least 5% different than the first material flowrate.

6. The method of claim 1, wherein the second material output temperature is at least 5 degrees Centigrade lower than the first material output temperature.

7. The method of claim 1, wherein the permeable material comprises synthetic fibers.

8. The method of claim 3, wherein the print material bonds with an under structure.

9. The method of claim 4, wherein the woven fabric comprises woven filaments having a diameter of about 0.20 mm to about 1.2 mm.

* * * * *